United States Patent
Lim et al.

(10) Patent No.: US 8,010,478 B2
(45) Date of Patent: Aug. 30, 2011

(54) CONTEXT AWARE SYSTEM AND CONTEXT AWARE METHOD THEREOF

(75) Inventors: Myung Eun Lim, Daejeon (KR); Jae Hun Choi, Daejeon (KR); Soo Jun Park, Seoul (KR); Seon Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 672 days.

(21) Appl. No.: 12/171,448

(22) Filed: Jul. 11, 2008

(65) Prior Publication Data

US 2009/0157587 A1    Jun. 18, 2009

(30) Foreign Application Priority Data

Dec. 17, 2007    (KR) .................. 10-2007-0132322

(51) Int. Cl.
*G06N 5/00* (2006.01)
(52) U.S. Cl. .......................... 706/47; 706/45
(58) Field of Classification Search .............. 706/47, 706/45
See application file for complete search history.

(56) References Cited

FOREIGN PATENT DOCUMENTS

KR    1020070039785 A    4/2007
KR    1020070058857 A    6/2007

OTHER PUBLICATIONS

Tsuruoka, et al, Training a Naive Bayes Classifier via the EM Algorithm with a Class Distribution Constraint, CONLL '03 Proceedings of the seventh conference on Natural language learning at HLT-NAACL 2003—vol. 4, pp. 127-134.*
Veeramachaneni, et al, Analytical Results on Style-Constrained Bayesian Classification of Pattern Fields, IEEE Transactions on Pattern Analysis and Machine Intelligence, vol. 29, No. 7, Jul. 2007, pp. 1280-1285.*
Wang, et al, A Study on the Document Zone Content Classification Problem, DAS 2002, LNCS 2423, pp. 212-223.*

* cited by examiner

*Primary Examiner* — Wilbert L Starks
(74) *Attorney, Agent, or Firm* — Ladas & Parry LLP

(57) ABSTRACT

A context aware system and a context aware method thereof perform a reasoning to be aware of contexts in ubiquitous environments. The context aware method includes procedures of modeling a knowledge base describing context information including constraints; classifying the context information described in the knowledge base according to the constraints; filtering fact data having same constraints as input sensor data from the classified context data; storing only rules, which satisfy the filtered fact data and constraints, in an working memory; and inferring a service context by reasoning the stored fact data and rules. The method receives input sensor data, associated with a subject, continuously monitored and serviced by indoor sensors, performs a reasoning based upon the input sensor data, in order to be aware of the present contexts of the subject and also provide, in real-time, a service suitable for the present contexts, thereby promoting the convenience of life.

9 Claims, 5 Drawing Sheets

```
constraint_type  ::= TEMPORAL | SPATIAL | OBJECT
constraint_value ::= (location_symbol) | (time, range) | obj_name | NONE)*
constraint_target ::= name of object
location_symbol = name_of_location_instance | position_value
time = HH:MM
range = minutes
obj_name = any name of OBJECT defined in the ontology
position_value = any representation of position, e.g. (x_axis, y_axis)
```

FIG. 3

```xml
<Knowledge xmlns:xsi="http://www.w3.org/2001/XMLSchema-instance"
xsi:type="Knowledge">
  <Atoms>
    <Atoms name="User" type="object">
      <AProperty name="isLocatedIn" type="string" />
      <AProperty name="useDevice" type="object" />
      <AProperty name="inAlarm" type="string" />
    </Atoms>
    <Atom name="Service" type="string" constraint_type="TEMPORAL" />
    <Atom name="Device" type="object" />
    <Atom name="TV" type="string" constraint_type="SPATIAL" />
    <Atom name="Computer" type="string" constraint_type="OBJECT"
      constraint_target="User" />
    </Atoms>
    <Atoms name="Location" type="object">
      <AProperty name="hasDevie" type="string" multiple="false" />
      <AProperty name="hasUser" type="string" multiple="false" />
    </Atom>
    <Atoms name="Schedule" type="object" constraint_type="TEMPORAL">
      <AProperty name="hasTime" type="string" multiple="false" />
      <AProperty name="workToDo" type="object" multiple="false" />
    </Atom>
  </Atoms>
  <Rules>
    <Imp name="showSchedule">
      <Head>
        <Predicate propName="display">
          <Variable>d</Variable>
          <Variable>w</Variable>
        </Predicate>
      </Head>
      <Body operator="and">
        <Predicate propName="isLocatedIn">
          <Variable>u</Variable>
          <Value>Living Room </Value>
        </Predicate>
        <Predicate propName="hasDevice">
          <Value>Living Room </Value>
          <Variable>u</Variable>
        </Predicate>
        <Predicate propName="workToDo">
          <Variable>s</Variable>
          <Variable>w</Variable>
        </Predicate>
        <Predicate propName="hasTime">
          <Variable>s</Variable>
          <Value>07:00</Value>
        </Predicate>
      </Body>
    </Imp>
    ...
  <Rules>
  <Instances>
    <Instance name="Gil-Dong HONG " atom="User">
      <IProperty target="isLocatedIn">
        <Value>Living Room</Value>
      </IProperty>
      <Property target="useDevice">
        <Value></Value>
      </IProperty>
      <IProperty target="inAlarm">
        <Value>false</Value>
      </IProperty>
    </Instance>
    <Instance name="Living RoomTV" atom="TV"
      constraint_value="Living Room" />
    <Instance name="Notebook1" atom="Computer"
      constraint_value="Gil-Dong HONG" />
    <Instance name="Breakfast" atom="Schedule"
      constraint_value="07:00/60">
      <IProperty target="hasTime">
        <Value>07:30</Value>
      </IProperty>
      <IProperty target="workToDo">
        <Value>Making Breakfast Breakfast </Value>
      </IProperty>
    </Instance>
  </Instances>
```

FIG. 4

CONTEXT AWARE SYSTEM AND CONTEXT AWARE METHOD THEREOF

CROSS-REFERENCE TO RELATED APPLICATIONS

This application claims the priority of Korean Patent Application No. 2007-132322 filed on Dec. 17, 2007 in the Korean Intellectual Property Office, the disclosure of which is incorporated herein by reference.

BACKGROUND OF THE INVENTION

1. Field of the Invention

The present invention relates to context aware technology, and more particularly, to a context aware system and a context aware method thereof, which manage facts and rules necessary for context awareness according to constraints in ubiquitous environments, thereby reasoning service contexts.

The present invention was supported by the IT R&D program of MIC/IITA[2006-S007-02, Ubiquitous Health Monitoring Module and System Development].

2. Description of the Related Art

Context aware technology in ubiquitous environments is being utilized to recognize contexts and discern services in order to provide a desired service based upon sensor data acquired from users, peripheral devices and surrounding environments.

In general, context aware systems have a large amount of context information and rules for contextual inference, and make a inference through reasoning. The more the context information and the rules are used in the reasoning, the longer reasoning time may be. The increased reasoning time acts as an obstacle against real-time processing.

However, in actual service environments, data is delivered in real-time from a sensor surrounding a user, and contextual inference also requires real-time processing. Thus, real-time processing is an essential factor in the context aware service.

In order to ensure real-time processing, it is required to complement a reasoning method. reasoning methods based upon ontologies, as an attempt to enhance reasoning speed, use cashing methods for rules and contexts, or reducing the number of rules stored in a memory in a processing time by organizing an ontology into a upper level ontology, which is domain-independent, and a lower level ontology, which is domain-dependent. In particular, conventional technologies have attempted to improve speed by reducing the number of context information used in reasoning. That is, a context aware application analyzes queries to be used in the context awareness, so that only context information associated with the queries is stored in the working memory in real-time. In the meantime, ubiquitous data generally include spatial components and temporal components. The spatial components and the temporal components are included in context information, which can be filtered with respect to the spatial and temporal components since the conventional technologies do not consider neither the spatial components nor the temporal components. Accordingly, there is still a large amount of data to be processed.

SUMMARY OF THE INVENTION

The present invention has been made to solve the foregoing problems with the prior art, and therefore the present invention provides a context aware system and a context aware method thereof, which store, as knowledge in the form of an ontology, context information and context classification rules about services and environments in ubiquitous environments, and store part of facts and rules, necessary for context awareness, in a reasoning engine according to constraints in order to make a reasoning.

According to an aspect of the present invention, the context aware system includes a knowledge base describing context information including constraints; a classifier classifying the context information described in the knowledge base according to the constraints; a fact filter filtering fact data having same constraints as input sensor data from the classified context information; and a reasoning engine storing only the filtered fact data and rules that satisfy the constrains, and inferring a service context by reasoning the stored fact data and rules.

According to another aspect of the present invention, the context aware method of the context aware system includes procedures of: modeling a knowledge-base describing context information including constraints; classifying the context information described in the knowledge base according to the constraints; filtering fact data having same constraints as input sensor data from the classified context data; storing only rules, which satisfy the filtered fact data and constraints, in an working memory; and inferring a service context by reasoning the stored fact data and rules.

As set forth above, the present invention receives input sensor data, associated with a subject, who is supposed to be continuously monitored and serviced by indoor sensors, and performs a reasoning based upon the input sensor data, in order to be aware of the present contexts of the subject and also provide, in real-time, a service suitable for the present contexts, thereby promoting the convenience of life.

Furthermore, the present invention can be effectively used in similar contexts, which require context awareness focused on private users. The similar contexts include, for example, an application such as a medication reminding service for chronic patients, which requires context awareness and service inference functions.

BRIEF DESCRIPTION OF THE DRAWINGS

The above and other aspects, features and other advantages of the present invention will be more clearly understood from the following detailed description taken in conjunction with the accompanying drawings, in which:

FIG. 3 is an algorithm illustrating constraint elements and an expressing method according to an embodiment of the present invention;

FIG. 4 is an algorithm illustrating an example of XML expression of a knowledge base according to an embodiment of the present invention.

DETAILED DESCRIPTION OF THE PREFERRED EMBODIMENT

Hereinafter, exemplary embodiments of the present invention will now be described in detail with reference to the accompanying drawings. Descriptions of well-known functions and constructions are omitted for clarity and conciseness.

An exemplary embodiment of the present invention has been devised in consideration of the characteristics of multiple sensor data, so that a context model makes a context reasoning without using entire context information. That is, object-relation information of the context information includes some items, which describe constraints about temporal-spatial information and dependent relation information, and before or in the occurrence of the sensor data, only context information and rules, which satisfy associated constrains, are stored in a working memory. Another exemplary embodiment of the present invention makes a reasoning for context information and rules, stored in the memory, thereby improving the efficiency of the reasoning.

The following part of the description will present a context aware system and a context aware method thereof, which become aware of contexts by the input of multiple sensor information in ubiquitous environments. First, the construction of the context aware system will be described more fully with reference to the accompanying drawings.

Figure 1:
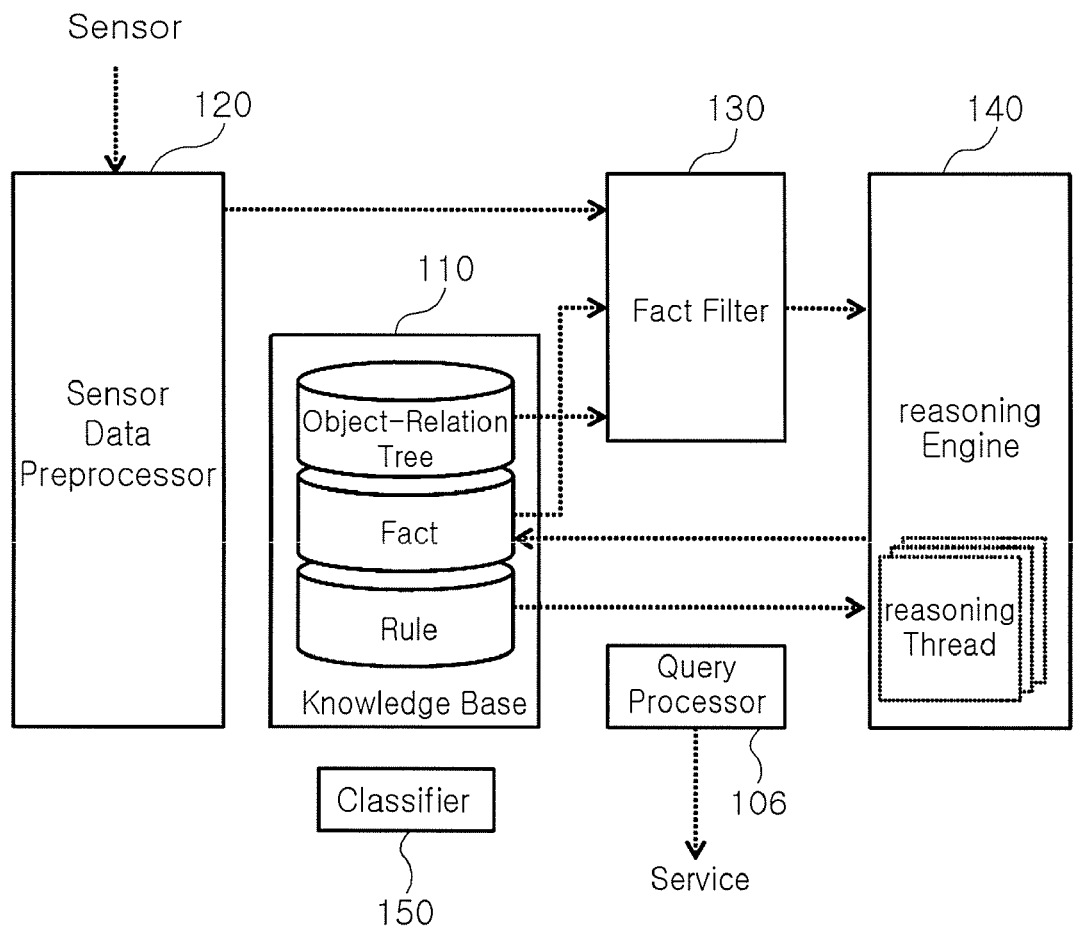
FIG. 1 is a block diagram illustrating the construction of a context aware system according to an embodiment of the present invention.

FIG. 1 is a block diagram illustrating the construction of a context aware system according to an embodiment of the present invention.

Referring to FIG. 1, the context aware system includes a knowledge base 110, a sensor data preprocessor 120, a fact filter 130, a reasoning engine 140, a classifier 150 and an query processor 160.

The knowledge base 110 primarily describes elements of contexts, relations of each element and occurring conditions of contexts. The knowledge base 110 forms an object-relation tree using the elements of contexts and the relations of elements, and declares actual instances of objects as facts. At the same time, constrains, which will be used to filter facts are also defined. The knowledge base 110 describes the constraints on the relation between the objects and the instances, and describes new facts as rules that will occur when constrains are met. An example of the knowledge described in the knowledge base 110 is shown in FIG. 2.

Figure 2:
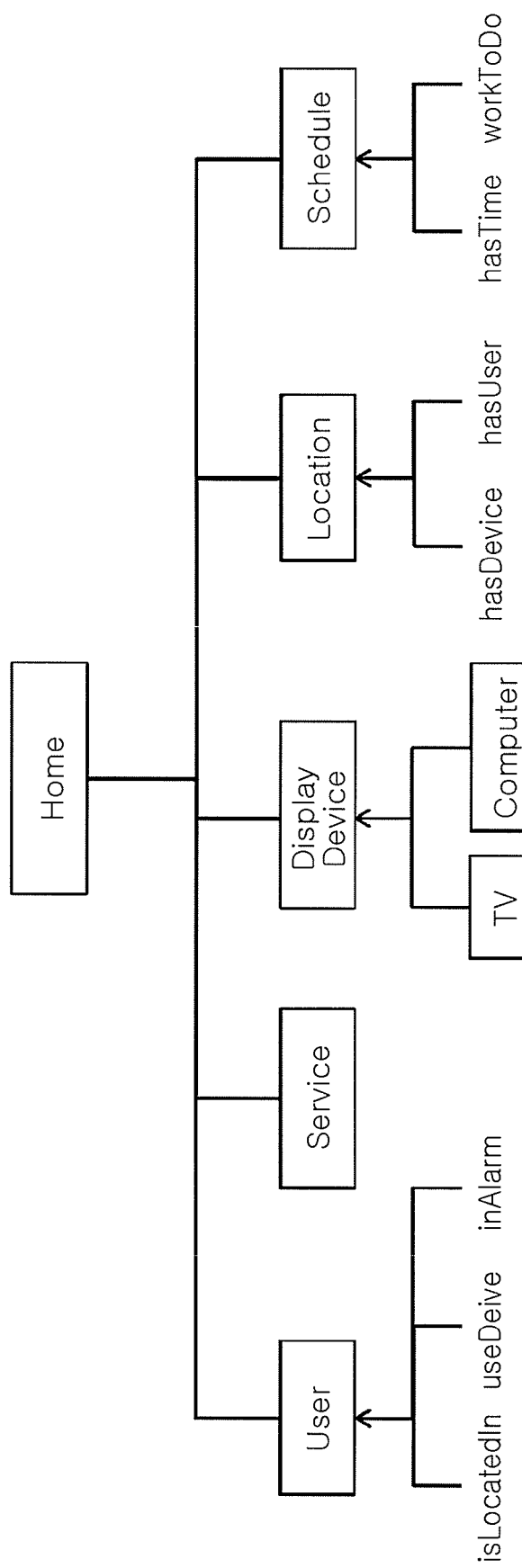
FIG. 2 is a tree diagram illustrating the construction of knowledge in a schedule notification service according to an embodiment of the present invention.

The knowledge as shown in FIG. 2 expresses a simple example of knowledge for a schedule notification service at home. The knowledge includes a target user, a display device at home, locations of users and devices, and user schedule. The objects have properties, which define the relation of the objects (e.g., the relation between isLocatedIn and Location, which indicates that the user is located in a specific place), and common properties, which defines constraints.

When the context aware system starts operation after defining the contexts, the sensor data preprocessor 120 collects raw data collected from various sensors, and maps the raw data as elements in knowledge. For example, the sensor data preprocessor 120 reads RFID from respective home appliances using RFID readers, and converts the ID into fact data about a specific appliance (e.g., a TV and a refrigerator) in the knowledge. Similarly, when indoor coordinates are acquired from vision or supersonic sensors, the sensor data preprocessor 120 converts the coordinates into fact data about spatial elements (e.g., a living room and a bed room).

The fact filter 130 filters the fact data according to described constraints, and delivers the filtered fact data to the reasoning engine 140.

Figure 5:
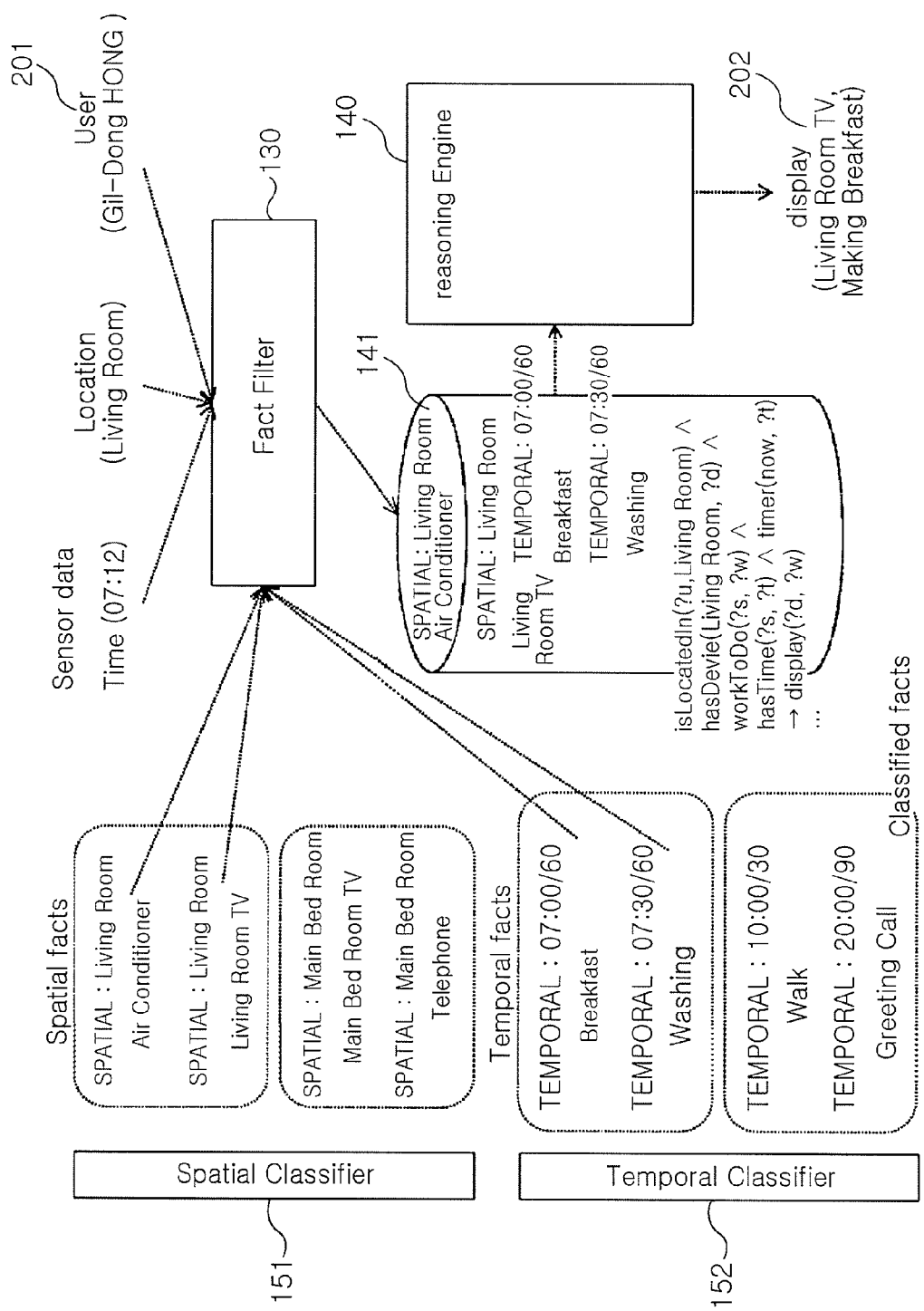
FIG. 5 is a block diagram illustrating a process of fact filtering and reasoning in a context aware system according to an embodiment of the present invention.

The reasoning engine 140 receives the fact data delivered from the fact filter 130 and the rules delivered from the knowledge base 110, generates a reasoning thread for the received data and rules to perform a reasoning procedure, and if a new fact is generated, delivers that fact to the knowledge base 110 to update the entire fact data stored therein. The reasoning engine 140 includes an working memory, which stores the received fact data and rules. As will be described later and is illustrated in FIG. 5, an working memory 141 can be separately provided from the reasoning engine 140.

When the knowledge base 110 about the context is formed and actual instances are generated, the classifier 150 classifies the instances according to reasoning constrains (e.g., spatial, temporal and object constraints) before actual processing of a reasoning. That is, the classifier 150 classifies the instances in such a fashion that the fact data, which are in the same or similar range with respect to the values of the constraints described in the preparation of the model, are registered in one registry.

The query processor 160 processes a query in response to an external service application inquiring of the knowledge base, and returns the result to the application.

Since the context aware system having the above-mentioned construction need rules and facts for context awareness, the rules and the facts are required to be previously set and be properly managed. Now, with reference to the accompanying drawings, a detailed description will be made of a context aware method of the context aware system, which manages rules and facts according to constraints, and reasons service contexts through the rules and facts in order to be aware of contexts.

For the context awareness, as mentioned above, respective constraints to be used in fact filtering are set simultaneously with the occurrence of actual objects and instances. The constraints can be divided into spatial, temporal and object constraints.

The spatial constrains are expressed by the name or coordinates of a spatial place, and indicate that a corresponding object or service (event) is a valid data only in a predetermined space. In the schedule management service as shown in FIG. 2, an object "TV" in a lower level of "Display Device" is defined to have a 'SPATIAL' type constraint, and an instance 'Living Room_TV' is generated as an instance of this object and with a constraint value 'Living Room.' Here, the instance 'Living Room_TV' expresses that this instance is valid only if a subject is in the living room.

Similarly to the spatial constraints, the temporal constraints are expressed by a reference time and a range from the reference time, and indicate that a corresponding object is a valid data only in a specific temporal range. In the schedule management service as shown in FIG. 2, an object 'Service' is defined to have a 'TEMPORAL' type constraint, and an instance 'Greeting' is generated with a constraint value '07:00/30.' Here, this instance expresses that the 'Greeting' service is valid (able to occur) only in a specific time range, that is, 30 minutes before and after 7 o'clock.

The object constraints are expressed with the name of a specific object, and indicate that a corresponding object subordinates a constrained specific object instance. In the schedule management system as shown in FIG. 2, an object 'Computer' is defined to have a constraint 'OBJECT,' a target object is set 'User,' and an instance 'Notebook_1' is generated with a constraint value 'Grand Father.' This expresses that the instance 'Notebook_1' subordinates the instance 'Grand Father' of instances of the object 'User.'

The objects and constraints declared as above are converted into actual instances in the form of facts, and are used for actual contextual inference of rules. Descriptive elements and an expressing method of the constraints are shown in FIG. 3.

Referring to FIG. 3, actual constrains are expressed by constraint_type and constraint_value. The constraint_type expresses the type of the constraint of an object, and may be in the form of 'TEMPORAL/SPATIAL/OBJECT.' The constraint_value specifies a constraint value of an actual instance generated from an object, and is described with a suitable type of constraint value according to the constraint type. Next, constraint_target appears only if the constraint_type is 'OBJECT,' and indicates the declared name of a subordinate object. The actual knowledge base including the constraints of FIG. 3 can be expressed by an XML document, and an example thereof is shown in FIG. 4.

The knowledge base 110 is a set of objects (atoms), rules and instances.

The objects are formed of properties indicating the relation and properties of constraints and objects, define templates of above-mentioned objects, and have specifications 'constraint_type' and 'constraint_target' about constraint types as properties.

The rules are composed of a body and a head of respective objects and properties, which are connected by 'And' operator, specify occurring conditions of a specific context and service, and indicate 'If satisfies (body) then execute (head).' For example, a rule XML 'showSchedule' shown in FIG. 3 may be expressed as follows:

'isLocatedIn (?u, Living Room)^hasDevice (Living Room, ?d)^workToDo (?s,?w)^hasTime (?s, ?t)^timer (now, ?t)->display (?d, ?w)'

The rules can be interpreted that 'User is in a living room; There is a schedule s; Output task w to a device d in the living room at 7 o'clock.' The reasoning engine 140 infers display (?d, ?w) as being 'TRUE' when facts satisfying such rules are present.

The instances have actual fact data according to the templates of objects. That is, the instances have a specification 'constraint_value' about a constraint value as properties.

When a knowledge base about contexts is constructed and actual instances are generated, the context aware system classifies the instances using the classifier 150 before actually processing a reasoning. This is because, when actual data of constraints are inputted, some data in the range consistent with the input data can be easily stored in the working memory. At this time, rule data are also stored. When sensor data are inputted, the context aware system performs a filtering on a fact set, that is, filters spatial and temporal constraints based upon the input sensor data. Then, the context aware system stores the filtered facts in the working memory, and performs a reasoning. This process will be described more fully, in which the notification service as shown in FIG. 2 will be used as an example of the filtering.

FIG. 5 is a block diagram illustrating a process of fact filtering and reasoning in a context aware system according to an embodiment of the present invention.

Referring to FIG. 5, the classifier 150 classifies, by a spatial classifier 151, some facts such as 'Air Conditioner,' 'Living Room TV,' 'Main Bed Room TV' and 'Telephone' to be in the same category. These facts have the same constraints as 'Device,' which has described spatial constraints. In the same fashion, the classifier 150 classifies, by a temporal classifier 152, facts according to temporal constraint values. In the meantime, object constraints can also be classified in the same fashion although not illustrated in the drawings.

When actual sensor data 202 are inputted, the fact filter 130 filters the classified facts using some data of the sensor data corresponding spatial/temporal values to acquire fact data in the same spatial/temporal range as the input sensor data 202, and stores the fact data in an working memory 141 of the reasoning engine 140. Describing in more detail, since the temporal/spatial data '07:12' and 'Living Room' are inputted, the fact filter 130 filters fact data such as 'Air Conditioner,' 'Living Room TV,' 'Breakfast' and 'Washing,' which are in the same or similar category of the input data, and stores the filtered fact data in the working memory 141. Here, the filtering of temporal constraints can be inferred by correctly matching time data, which periodically occur according to time data occurrence cycle, or by matching time range. The filtering of spatial constraints is performed on category data in response to a spatial change (e.g., movement from a living room to a main bed room). In object-dependent constraints, when the sensor data of a corresponding object are activated (e.g., a user 'Gil-Dong HONG' is detected at home), the filtering is performed to update fact data.

Then, the reasoning engine 140 performs a reasoning using the sensor data together with the fact data and rule sets stored in the working memory 141. Through forward reasoning or backward reasoning, given fact data and rules are inferred TRUE or not, and a result data set is generated. Then, from the above-mentioned rules and fact data, the reasoning engine 140 fires a 'Display (Living Room TV, Making Breakfast) data 202, which indicates an instruction 'Display a making-breakfast message on a living room TV.'

While the present invention has been described with reference to the particular illustrative embodiments and the accompanying drawings, it is not to be limited thereto but will be defined by the appended claims. It is to be appreciated that those skilled in the art can substitute, change or modify the embodiments in various forms without departing from the scope and spirit of the present invention.

What is claimed is:

1. A context aware system comprising:
    a knowledge base describing context information including constraints;
    a classifier classifying the context information described in the knowledge base according to the constraints;
    a fact filter filtering fact data having same constraints as input sensor data from the classified context information; and
    a reasoning engine storing only the filtered fact data and rules that satisfy the constrains, and inferring a service context by reasoning the stored fact data and rules.

2. The context aware system of claim 1, wherein the context information includes rules, which describe objects, relations of the objects, facts of declaration of actual instances of the objects, which construct a context, conditions about the relations of the objects and the instances, and occurring conditions of predetermined context and service.

3. The context aware system of claim 1, wherein the classifier includes:
    a spatial constraint classifier classifying fact data to be in one category in the constraints, the fact data having a same spatial constraint as an object, which has a described spatial constraint;
    a temporal constraint classifier classifying fact data to be in one category in the constraints, the fact data having a same temporal constraint as an object, which has a described temporal constraint; and
    an object constraint classifier classifying fact data to be in one category in the constraints, the fact data having a same temporal constraint as an object, which has a described object constraint.

4. The context aware system of claim 1, wherein the reasoning engine includes an working memory, which stores only the rules that satisfies the filtered fact data and the constraints.

5. A context aware method of a context aware system comprising:

modeling a knowledge base describing context information including constraints;
classifying the context information described in the knowledge base according to the constraints;
filtering fact data having same constraints as input sensor data from the classified context data;
storing only rules, which satisfy the filtered fact data and constraints, in an working memory; and
inferring a service context by reasoning the stored fact data and rules.

6. The context aware method of claim 5, wherein the context information includes rules, which describe objects, relations of the objects, facts of declaration of actual instances of the objects, which construct a context, conditions about the relations of the objects and the instances, and occurring conditions of predetermined context and service.

7. The context aware method of claim 5, wherein the constraints include a spatial constraint expressed by a name of a place, which indicates a space, a temporal constraint expressed by a reference time and a range from the reference time, and an object constraint expressed by a name of a predetermined object, which constructs the knowledge base.

8. The context aware method of claim 5, wherein the filtering of fact data having same constraints as input sensor data from the classified context data, comprises:
receiving the input sensor data;
checking data corresponding spatial/temporal values in the sensor data; and
filtering the classified context information to acquire fact data in same spatial/temporal ranges as the sensor data, corresponding to the checked spatial/temporal values.

9. The context aware method of claim 5, wherein the classifying of the context information described in the knowledge base according to the constraints, comprises:
classifying fact data to be in one category in the constraints, the fact data having a same spatial constraint as an object, which has a described spatial constraint;
classifying fact data to be in one category, the fact data having a same temporal constraint as an object in the constraints, which has a described temporal constraint; and
classifying fact data to be in one category in the constraints, the fact data having a same temporal constraint as an object, which has a described object constraint.

* * * * *